US012704849B2

(12) United States Patent
Angkititrakul et al.

(10) Patent No.: US 12,704,849 B2
(45) Date of Patent: Aug. 11, 2026

(54) MOBILE ROBOT WITH AUDIO PERCEPTION SYSTEM

(71) Applicant: Robert Bosch GmbH, Suttgart (DE)

(72) Inventors: Pongtep Angkititrakul, Dublin, CA (US); Jonathan Francis, Pittsburgh, PA (US); Luca Bondi, Pittsburgh, PA (US); Samarjit Das, Wexford, PA (US)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 18/532,410

(22) Filed: Dec. 7, 2023

(65) Prior Publication Data

US 2025/0189970 A1 Jun. 12, 2025

(51) Int. Cl.
*G05D 1/243* (2024.01)
*G01S 3/80* (2006.01)
(Continued)

(52) U.S. Cl.
CPC ................ *G05D 1/243* (2024.01); *G01S 3/80* (2013.01); *G01S 15/89* (2013.01); *G10L 15/02* (2013.01);
(Continued)

(58) Field of Classification Search
CPC ............... G05D 1/243; G05D 2105/10; G05D 2111/20; G01S 3/80; G01S 15/89;
(Continued)

(56) References Cited

U.S. PATENT DOCUMENTS 9,874,873 B2 1/2018 Angle et al.
9,962,054 B2 5/2018 Seo et al.
(Continued)

FOREIGN PATENT DOCUMENTS

CN 104423797 3/2018
EP 3831548 6/2021

OTHER PUBLICATIONS

Tatiya et al., "Knowledge-Driven Scene Priors for Semantic Audio-Visual Embodied Navigation," arXiv:2212.11345v1 [cs.RO], Dec. 21, 2022, pp. 1-19.
(Continued)

*Primary Examiner* — Khoi H Tran
(74) *Attorney, Agent, or Firm* — Kathy Takeguchi; Maginot, Moore & Beck LLP

(57) ABSTRACT

A mobile robot includes a microphone array with a set of microphones. The microphone array is at least partially disposed on the mobile robot. The mobile robot receives audio signals from the microphone array. Audio feature data of acoustic activity is extracted from the audio signals. Direction of arrival (DOA) data of the acoustic activity is generated based on the audio signals. A machine learning model is configured to generate audio event data using the audio feature data. The audio event data identifies at least one sound source of the audio feature data. A knowledge graph is queried using the audio event data to obtain entity data. The entity data has a predetermined relation with the audio event data. Semantic audio scene data is generated using the audio event data, the DOA data, and the entity data. The mobile robot performs an action based on the semantic audio scene data.

20 Claims, 4 Drawing Sheets

(51) Int. Cl.

| | |
|---|---|
| ***G01S 15/89*** | (2006.01) |
| ***G10L 15/02*** | (2006.01) |
| ***G10L 15/18*** | (2013.01) |
| ***G10L 15/22*** | (2006.01) |
| ***G10L 21/0208*** | (2013.01) |
| ***H04R 1/02*** | (2006.01) |
| ***H04R 1/40*** | (2006.01) |
| ***H04R 3/00*** | (2006.01) |
| *G05D 105/10* | (2024.01) |
| *G05D 111/20* | (2024.01) |

(52) U.S. Cl.
CPC .......... *G10L 15/1815* (2013.01); *G10L 15/22* (2013.01); *G10L 21/0208* (2013.01); *H04R 1/028* (2013.01); *H04R 1/406* (2013.01); *H04R 3/005* (2013.01); *G05D 2105/10* (2024.01); *G05D 2111/20* (2024.01); *G10L 2015/223* (2013.01)

(58) Field of Classification Search
CPC ..... G10L 15/02; G10L 15/1815; G10L 15/22; G10L 21/0208; G10L 2015/223; H04R 1/028; H04R 1/406; H04R 3/005
See application file for complete search history.

(56) References Cited

U.S. PATENT DOCUMENTS

| | | | | |
|---|---|---|---|---|
| 2012/0185094 | A1* | 7/2012 | Rosenstein | B25J 5/007 901/1 |
| 2014/0218517 | A1 | 8/2014 | Kim et al. | |
| 2020/0402505 | A1* | 12/2020 | Park | G10L 15/22 |
| 2021/0224579 | A1 | 7/2021 | Jones et al. | |
| 2021/0327402 | A1* | 10/2021 | Xie | G10K 11/17885 |
| 2023/0244506 | A1* | 8/2023 | Geller | G06F 3/0481 715/764 |
| 2023/0245651 | A1* | 8/2023 | Wang | G06N 5/022 704/275 |
| 2025/0006199 | A1* | 1/2025 | Lin | G10L 15/20 |
| 2025/0127362 | A1* | 4/2025 | Ding | G05D 1/65 |
| 2025/0158848 | A1* | 5/2025 | Yoo | H04L 12/28 |

OTHER PUBLICATIONS

Tribby, "Assessing the accuracy of directional real-time noise monitoring systems," Proceedings of Acoustics 2016, Nov. 9-11, 2016, Brisbane, Australia, pp. 1-10.

Evers et al., "Acoustic Slam," IEEE/ACM Transactions on Audio, Speech, and Language Processing, vol. 26, No. 9, Sep. 2018, pp. 1484-1498.

Barchiesi et al., "Acoustic Scene Classification," arXiv:1411.3715v1 [cs.SD], Nov. 13, 2014, IEEE, 41 pages.

Mnasri et al., "Anomalous sound event detection: A survey of machine learning based methods and applications," Multimedia Tools and Applications (2022), https://doi.org/10.1007/s11042-021-11817-9, Dec. 27, 2021, pp. 5537-5586.

* cited by examiner

MOBILE ROBOT WITH AUDIO PERCEPTION SYSTEM

TECHNICAL FIELD

This disclosure relates generally to mobile robots, and more particularly to mobile robots with digital audio processing for semantic perception of audio scenes.

BACKGROUND

Mobile robots are sometimes used in the residential domain. For example, vacuum robots may be used to vacuum homes with minimal user interaction. To do so, these vacuum robots use sensors to sense their environment and navigate around various obstacles. For instance, the sensors may include a camera, a motion sensor, a bump sensor, and the like. However, these vacuum robots may have difficulty navigating around objects in a number of scenarios, such as when there is insufficient lighting, camera malfunction, object occlusion, etc.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to controlling a mobile robot in an environment. The method includes receiving audio signals via a microphone array. The microphone array is at least partially disposed on the mobile robot. The method includes extracting audio feature data of acoustic activity from the audio signals. The method includes generating Direction-of-Arrival (DOA) data of the acoustic activity based on the audio signals. The method includes generating, via at least one machine learning model, audio event data using the audio feature data. The audio event data identifies at least one sound source of the audio feature data. The method includes extracting entity data by using the audio event data to query a knowledge graph. The entity data has a relation with the audio event data. The method includes generating semantic audio scene data using the audio event data, the DOA data, and the entity data. The method includes performing an action of the mobile robot based on the semantic audio scene data.

According to at least one aspect, a mobile robot includes at least a microphone array, one or more processors, and one or more memory. The one or more processors are in data communication with the microphone array. The one or more memory are in data communication with the one or more processors. The one or more memory include computer readable data including instructions stored thereon that, when executed by the one or more processors, performs a method. The method includes receiving audio signals via a microphone array. The microphone array is at least partially disposed on the mobile robot. The method includes extracting audio feature data of acoustic activity from the audio signals. The method includes generating DOA data of the acoustic activity based on the audio signals. The method includes generating, via at least one machine learning model, audio event data using the audio feature data. The audio event data identifies at least one sound source of the audio feature data. The method includes extracting entity data by using the audio event data to query a knowledge graph. The entity data has a relation with the audio event data. The method includes generating semantic audio scene data using the audio event data, the DOA data, and the entity data. The method includes performing an action of the mobile robot based on the semantic audio scene data.

According to at least one aspect, one or more non-transitory computer-readable mediums have computer readable data including instructions stored thereon that, when executed by one or more processors, cause the one or more processors to perform a method for controlling a mobile robot in an environment. The method includes receiving audio signals via a microphone array. The microphone array is at least partially disposed on the mobile robot. The method includes extracting audio feature data of acoustic activity from the audio signals. The method includes generating DOA data of the acoustic activity based on the audio signals. The method includes generating, via at least one machine learning model, audio event data using the audio feature data. The audio event data identifies at least one sound source of the audio feature data. The method includes extracting entity data by using the audio event data to query a knowledge graph. The entity data has a relation with the audio event data. The method includes generating semantic audio scene data using the audio event data, the DOA data, and the entity data. The method includes performing an action of the mobile robot based on the semantic audio scene data.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
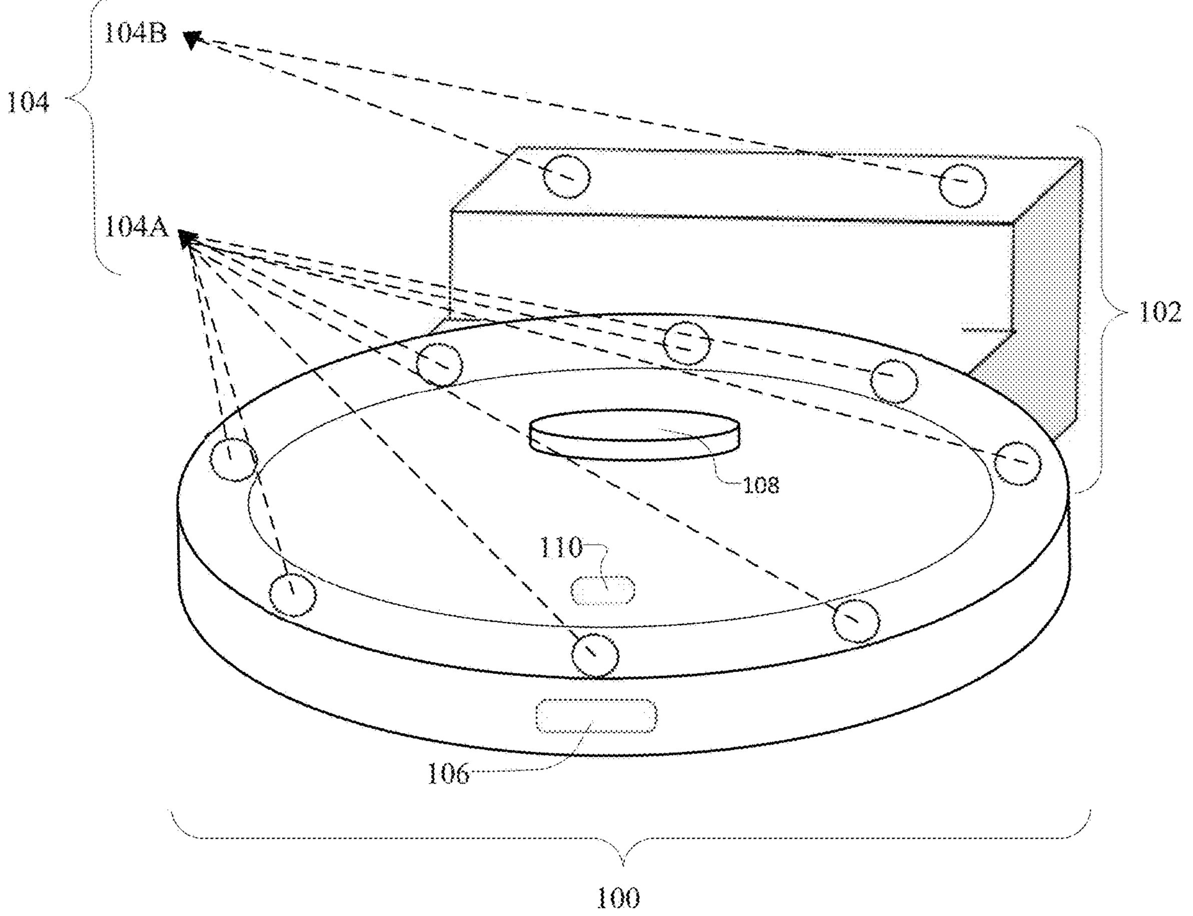
FIG. 1 is a diagram of an example of a mobile robot that includes an audio perception system according to an example embodiment of this disclosure.

FIG. 1 is a diagram of a non-limiting example of a mobile robot 100 and a docking station 102 according to an example embodiment. More specifically, the mobile robot 100 is configured to connect or engage with a docking station 102, which includes at least a power supply. The power supply is configured to charge a battery of the mobile robot 100 when the mobile robot 100 is connected or engaged with the docking station 102. In addition, the mobile robot 100 is configured to disconnect or disengage with the docking station 102 and move autonomously or at least partially autonomously around its environment.

In addition, the mobile robot 100 is configured to perform one or more actions. For example, in FIG. 1, the mobile robot 100 is a cleaning robot, which includes a cleaning apparatus (e.g., vacuum assembly, etc.). The mobile robot 100 is configured to perform an action relating to navigating and moving around its environment. The mobile robot 100 is also configured to perform at least one action relating to cleaning surfaces (e.g., flooring, carpet, etc.) while stationary in its environment, while moving around its environment, or while transitioning between stationary and moving (or vice versa). In addition, the mobile robot 100 is configured to perform one or more other actions (e.g., sending notifications, sending alerts, etc.) with respect to particular detections, particular recognized audio events, and/or particular semantic audio scene data, as described later in this disclosure.

Also, as shown in FIG. 1, the mobile robot 100 includes a microphone array 104. The microphone array 104 may include a set of microphones. In some implementations and/or embodiments, the microphone array may be spherical, binaural, or any compatible type. The microphone array 104 may include one or more omnidirectional microphones that are configured to receive sounds or acoustic information from all directions.

The microphone array 104 includes a number of microphones, which are configured to detect external sounds of the mobile robot 100, internal sounds of the mobile robot 100, or both internal and external sounds of the mobile robot 100. In some implementations and/or embodiments, the microphone array 104 is only disposed on or carried by the mobile robot 100. In this regard, the microphone array 104 may be located on or carried by various surfaces of the mobile robot 100 itself to detect acoustic activity in its environment, self-noise, or a combination thereof. In other implementations and/or embodiments, the microphone array 104 includes a first subset of microphones, which are disposed on or carried by the mobile robot 100, and a second subset of microphones, which are strategically located elsewhere (i.e., not disposed on and/or carried by the mobile robot 100 itself). For example, in FIG. 1, the mobile robot 100 includes a microphone array 104, which includes a first subset 104A of microphones located on the mobile robot 100 and a second subset 104B of microphones located on the docking station 102. The first subset 104A is configured detect acoustic activity of the mobile robot's environment, self-noise, or a combination thereof. The second subset 104B includes one or more microphones, which may be used to monitor the region of the environment that is in a vicinity of and around the docking station 102. In the example shown in FIG. 1, the number of microphones in the first subset 104A is greater than the number of microphones in the second subset 104B.

With respect to the placement of microphones on the mobile robot 100, the microphone array 104 may include microphones located on or carried by various surfaces of the mobile robot 100. For instance, the microphone array 104 may include a number of microphones, which are disposed on one or more surfaces (e.g., top surface, upper surface, exterior surface, etc.) of the mobile robot 100. The microphone array 104 may include one or more microphones, which are positioned along one or more circumferential portions or peripheral portions of the mobile robot 100. The microphone array 104 may include one or more microphones, which are positioned along on one or more side portions of the mobile robot 100. For example, in FIG. 1, the microphone array 104 includes a number of microphones, which are located at peripheral portions on exterior surface portions of the mobile robot 100. In this example, the microphones are uniformly spaced around the circumference of the upper or top surface portions of the mobile robot 100.

In addition, one or more surfaces of the mobile robot 100 may also include a power button 108 and a light indicator 110. For instance, in FIG. 1, the power button 108 and light indicator 110 are located on an upper/top, exterior surface of the mobile robot 100. A state or color of the light indicator 110 may indicate a status (e.g., battery status, operating status, etc.) of the mobile robot 100.

With respect to the placement of microphones on the docking station 102, the microphone array 104 may be located on or carried by various surfaces of the docking station 102. For instance, the microphone array 104 may include a number of microphones, which are disposed on one or more surfaces (e.g., top surface, upper surface, exterior surface, etc.) of the docking station 102. The microphone array 104 may include one or more microphones, which are positioned along one or more circumferential portions or peripheral portions of the docking station 102. The microphone array 104 may include one or more microphones, which are positioned along on one or more side portions of the docking station 102. For example, in FIG. 1, the microphone array 104 includes a number of microphones, which are located on top exterior surface portions of the docking station 102. As shown in FIG. 1, the microphones are located at opposite end portions of the docking station 102. In this example, the microphones are aligned along a longitudinal axis of the docking station 102.

The mobile robot 100 is configured to obtain acoustic information of its environment via the microphone array 104 while also collecting other information from one or more other sensors 106 (e.g., camera, LIDAR, etc.) of the sensor system 608. More specifically, with respect to obtaining acoustic information, the mobile robot 100 is configured to receive multi-channel audio signals from the microphone array 104. The mobile robot 100 includes an audio perception system 200, which receives and processes the audio signals obtained from the microphone array 104. The mobile robot 100 is configured to generate semantic audio scene data based on the raw audio signals. The mobile robot 100 is configured to use the semantic audio scene data, other information (e.g., digital images, map data, motion sensor data, metadata, other sensor data, etc.), a semantic map, or any number and combination thereof while operating in its environment.

The mobile robot 100 is configured to operate in a number of different modes, which relate to the audio perception system 200. For example, the mobile robot 100 is configured to operate in an audio monitoring mode in which the mobile robot 100 is configured to listen for acoustic activity without performing certain sound-inducing actions (e.g., moving, vacuuming, etc.) and/or with minimal to no self-noise so that the mobile robot 100 is enabled to detect and recognize acoustic activity most effectively by being stationary in its environment. As another example, the mobile robot 100 is configured to operate in a patrolling mode in which the mobile robot 100 minimizes self-noise by not performing some actions (e.g., vacuuming) so that the mobile robot 100 is able to better detect and recognize acoustic activity in its environment. The mobile robot 100 may also be able to recognize it own internal noises or self-noises that don't relate to certain actions such as cleaning. More specifically, in patrolling mode, the mobile robot 100 may move and/or be stationed around its environment while disabling some actions (e.g., debris suctioning, vacuuming, etc.) so that the mobile robot 100 is enabled to recognize acoustic activity in the environment better than when the mobile robot 100 is cleaning (e.g., vacuuming). Also, as yet another example, the mobile robot 100 is configured to operate in normal operating mode. In normal operating mode, the mobile robot 100 is configured to perform at least one action (e.g., vacuuming) while being stationary or mobile in its environment. In normal operating mode, the mobile robot 100 is configured to detect and recognize acoustic activity in its environment and also recognize acoustic activity (e.g., internal noise, self-noise, etc.) relating to the mobile robot 100 itself. As discussed above, the mobile robot 100 is controlled more effectively by using acoustic information obtained from the audio signals via the audio perception system 200.

Figure 2:
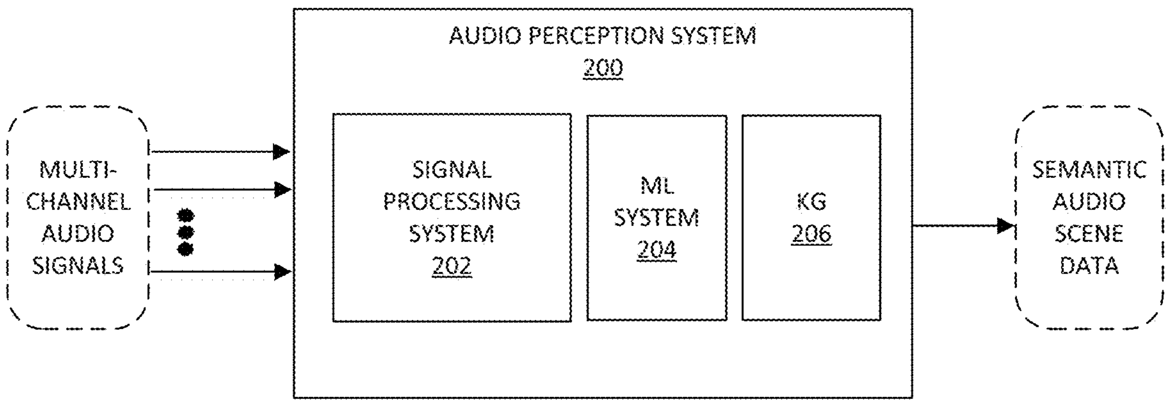
FIG. 2 is a diagram of an example of an audio perception system according to an example embodiment of this disclosure.
Figure 3:
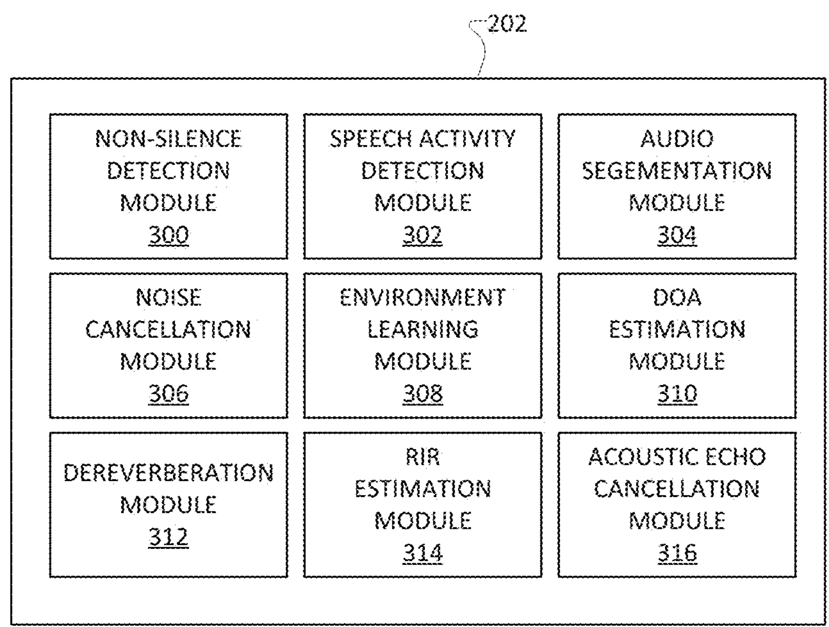
FIG. 3 is a block diagram of an example of a signal processing system according to an example embodiment of this disclosure.
Figure 4:
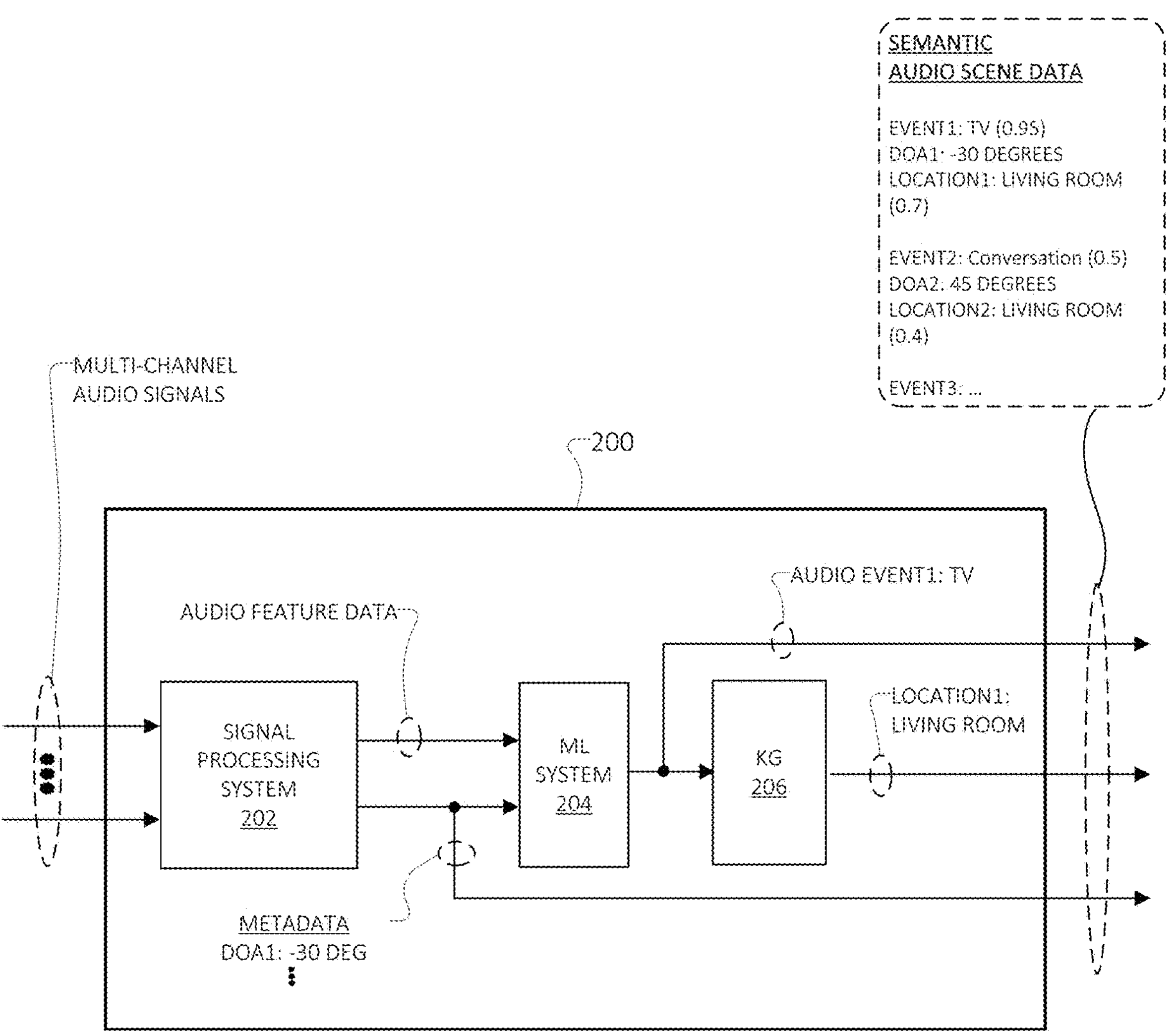
FIG. 4 is a flow diagram of an example of the audio perception system according to an example embodiment of this disclosure.

FIG. 2, FIG. 3, and FIG. 4 illustrate aspects of an example of the audio perception system 200 according to an example embodiment. More specifically, as shown in FIG. 2 and FIG. 4, the audio perception system 200 is configured to process the audio signals captured by a microphone array 104. The audio perception system 200 is configured to filter and detect acoustic information of interest. The audio perception system 200 is configured to recognize one or more sound patterns of interest, one or more sound sources, and a corresponding location of each sound source. The audio perception system 200 is configured to generate semantic audio scene data using the raw audio signals. For example, in FIG. 2 and FIG. 4, the audio perception system 200 includes at least a signal processing system 202, a machine learning (ML) system 204, and a knowledge graph (KG) 206.

Referring to FIG. 3, the signal processing system 202 is configured to receive multi-channel audio signals from the microphone array. The signal processing system 202 is configured to process the multi-channel audio signals and generate audio feature data of these audio signals for the ML system 204. The signal processing system 202 includes a number of modules. For example, in FIG. 3, the set of modules include a non-silence detection module 300, a speech activity detection module 302 an audio segmentation module 304, a noise cancellation module 306, an environment learning module 308, a DOA estimation module 310, a dereverberation module 312, a room-impulse-response (RIR) estimation module 314, and an acoustic echo cancellation module 316. The signal processing system 202 may include or any number and combination of modules from this set of modules.

The non-silence detection module 300 is configured to detect non-silence with respect to the audio signals. In this regard, for example, the non-silence detection module 300 is configured to detect acoustic activity from the audio signals. The signal processing system 202 is configured to extract or generate audio feature data relating to non-silence detection or acoustic activity of the audio signals.

The speech activity detection module 302 is configured to identify and distinguish segments of audio signals containing human or non-human voices. In this regard, for instance, the speech activity detection module 302 is configured to detect the speech activities from the audio signals, filter out the speech activities from the audio signals to obtain the non-speech activities, and then generate audio feature data relating to these non-speech activities. Accordingly, the speech activity detection module 302 is configured to generate audio feature data relating to speech activities and non-speech activities with respect to the audio signals.

In addition, the signal processing system 202 may include a speech filtering module, which detects speech (e.g., human speech) in the audio signals. The signal processing system 202 may filter and detect speech information of interest. For example, in some implementations and/or embodiments, after detecting an audio segment is a human voice, the audio perception system 200 is configured to classify the audio segment with respect to one of the control commands (e.g., stop vacuuming, start vacuuming, return to docking station 102, etc.) for controlling the mobile robot 100. Also, the signal processing system 202 is configured to remove or encrypt speech detections relating to privacy concerns before performing further downstream tasks. This removal or encryption is configured to resolve user privacy concerns.

The audio segmentation module 304 is configured to provide audio feature data relating to one or more segments of the audio signals. The segments may comprise various durations. For example, the segments may include a first segment of acoustic activity of an audio signal that has a first time length, a second segment of another acoustic activity of the audio signal that has a second time length, and so forth. As one example, for instance, the length of a segment may be determined by a duration of detected acoustic activity (e.g., speech activity, etc.) in the audio signals.

The noise cancellation module 306 is configured to reduce unwanted sound by the addition of another sound specifically designed to cancel the unwanted sound. The noise cancellation module 306 is configured to provide audio feature data relating to the noise cancellation performed with respect to the audio signals.

The environment learning module 308 is configured to detect and monitor dynamic changes in acoustic environmental conditions. The environment learning module 308 is configured to extract knowledge from these acoustic environmental conditions, such as identifying various noise types and mapping the distribution of background acoustics. The environment learning module 308 serves as a valuable resource to enhance the functionality of other signal processing components, as well as the ML system 204. The environment learning module 308 is configured to generate audio feature data relating to the acoustic environmental conditions.

The DOA estimation module 310 is configured to perform Direction-of-Arrival (DOA) estimation by beamforming, deep learning frameworks, any suitable DOA estimation technique, or any number and combination thereof. In addition, the signal processing system 202 is configured to generate DOA data based on the DOA estimation. The DOA data provides a relative direction of each sound source detected by the mobile robot 100. The DOA estimation module 310 is configured to generate DOA data relating to an estimation of a relative direction (e.g., 30 degrees, 45 degrees, etc.) of each sound source. In addition, the DOA estimation module 310 is configured to generate audio feature data relating to the DOA data of the audio signals.

The dereverberation module 312 is configured to counteract the effects of reverberation in the enclosed space such as rooms and halls. Such sound reflection is a natural acoustic phenomenon that can lead to degraded audio quality. The dereverberation module 312 is configured to enhance the clarity and intelligibility of the audio signals. The dereverberation module 312 is configured to analyze the characteristics of the reverberant components in the audio signal and apply corrective measures to reduce or eliminate them. The dereverberation module 312 is configured to generate audio feature data relating to this dereverberation of the audio signals.

The RIR estimation module 314 is configured to perform RIR estimation with respect to the audio signals. The RIR estimation module 314 is configured provide audio feature data relating to the RIR estimation, which measures and models the way sound interacts with its environment including reflection, reverberation, and echoes. The audio feature data provides information and/or the sound behavior within a specific environment. More specifically, for example, this audio feature data, relating to the RIR estimation, offers insights into room characteristics, such as room surface data, room geometry data, room material data, etc. Such audio feature data supports an interpretation of the reflection patterns of sound within a given space. As a non-limiting example, for instance, the RIR estimation module 314 is configured to perform RIR estimation by emitting a sharp sound and analyzing the subsequently recorded back signal. The dereverberation module 312 is configured to generate audio feature data relating to RIR estimation.

The acoustic echo cancellation module 316 is designed to eliminate or reduce the presence of acoustic echoes in audio signals. Acoustic echoes arise when sound emitted by a loudspeaker is captured by microphones and reintroduced into the audio signal, causing unwanted feedback. This module is configured to identify the echo component in the audio signal and apply corrective measures to cancel or reduce its presence. Common techniques, such as adaptive filtering, can be employed to dynamically adapt to the characteristics of the echo. The acoustic echo cancellation module 316 is tailored to enhance the overall intelligibility and quality of the audio signals. The acoustic echo cancellation module 316 is configured to generate audio feature data relating to the acoustic echo cancellation.

As discussed above, the signal processing system 202 includes a number of modules, which are configured to receive raw audio signals from the set of microphones of the microphone array 104. The raw audio signals are multi-channel audio signals. The set of modules may process the audio signals in an order (e.g., one or more modules being performed simultaneously, sequentially, etc.) that effectively generates the audio feature data. For example, the signal processing system 202 is configured to perform signal processing to remove irrelevant information (e.g., noises, reverberation, echoes, etc.) from the raw audio signals and extract meaningful audio feature data from the raw audio signals. In this regard, the signal processing system 202 may process the audio signals via the noise cancellation module 306, the dereverberation module 312, the acoustic echo cancellation module 316, or any combination thereof before the other modules (e.g., audio segmentation module 304, speech activity detection module, etc.) of the signal processing system 202.

The signal processing system 202 is configured to perform signal processing via filtering, signal transformation, machine learning (e.g., an autoencoder, a pretrained ML model, or the like), or any audio processing means. The signal processing system 202 uses signal processing techniques to generate or extract audio feature data using the raw audio signals. The audio feature data may include one or more audio feature vectors, embedding data, any suitable ML format for the ML system 204, or any number and combination thereof. The audio feature data may include DOA data, metadata, etc. As a non-limiting example, the metadata may include, for example, environment information such as distribution mean and standard deviation of the last ten minutes from some portions of the audio signals. The signal processing system 202 provides the audio feature data to the ML system 204.

As shown in FIG. 2 and FIG. 4, the ML system 204 is configured to receive the audio feature data from the signal processing system 202. The ML system 204 may include a support vector machine (SVM), Gaussian mixture model (GMM), hidden Markov model (HMM), a neural network, any suitable machine learning model, or any number and combination thereof. As non-limiting examples, the ML system 204 may include a convolutional neural network (CNN), a recurrent neural network (RNN), long short-term memory (LSTM), any suitable neural network, or any number and combination thereof. The ML system 204 may include one or more pre-trained ML models. Alternatively, to the signal processing system 202 and the ML system 204, the audio perception system 200 may include an end-to-end machine learning system (e.g. neural network architectures) that extracts audio feature data from the audio signals and recognizes each sound pattern or acoustic activity of the audio signals.

The ML system 204 is configured to receive the audio feature data from the signal processing system 202. The ML system 204 is configured to identify one or more sound patterns of interest with respect to the audio feature data. The ML system 204 is configured to recognize at least one acoustic event of the audio feature data and generate audio event data using the audio feature data. The audio event data identifies at least one sound source of the audio feature data. The audio event data may identify various sound sources. As a non-limiting example, the audio event data may identify acoustic activity relating to a baby crying, glass breaking, a dog barking, a doorbell sound, a knocking sound, kitchen sounds (e.g., cooking, frying, chopping food, opening cabinets, etc.), a siren, a gunshot sound, radio, television, sneezing, coughing, screaming, etc. Referring to FIG. 4, as a non-limiting example, the ML system 204 is configured to classify the audio feature data as being a "TV" with probability data of 0.95. Given the probability data (or confidence score data of 0.95) of "TV" for this audio feature data, the audio perception system 200 is then configured to select and use "TV" as the audio event data with respect to the multi-channel audio signals.

In some implementations and/or embodiments, the ML system 204 is configured to recognize surface characteristics. In this regard, for instance, the ML system 204 is configured to recognize if a floor is carpet, concrete, hardwood, linoleum, or another floor material. The ML system 204 may be trained or pretrained with respect to sounds of the mobile robot 100 moving on these different types of floors. The ML system 204 may comprise a classifier, which is configured to generate audio event data (e.g., floor classification data such as carpet, tile, hardwood, etc.) using the audio feature data. With this audio event data and/or the semantic audio scene data, the mobile robot 100 may be configured to perform a predetermined action, such as only performing vacuuming when the mobile robot 100 recognizes itself as being on carpet. As another example, the mobile robot 100 may perform an action, such as switching from one mode (e.g., vacuuming mode) to another mode (e.g., audio monitoring mode, etc.) based on the semantic audio scene data. The semantic audio scene data helps the mobile robot 100 to recognize, monitor, and track various events and/or changes in its environment.

In some implementations and/or embodiments, the ML system 204 is configured to recognize acoustic activity that relates to when the mobile robot 100 starts to interact with (e.g., vacuum) any unacceptable items (e.g., clothes, curtains, cables, etc.). For example, ML system 204 may include a pre-trained ML model, which recognizes one or more internal sounds indicating when the dust/debris collector is full or substantially full. When the ML system 204 generates audio event data indicating a potential issue with the cleaning assembly (e.g., suctioning component, dust/debris collector, etc.), then the mobile robot 100 may activate an alert so that the user is notified of this potential issue via an I/O device, a mobile communication device 604, etc.

Also, in some implementations and/or embodiments, the ML system 204 is configured to recognize anomalous sounds, which may include internal sounds of the mobile robot 100, external sounds of the mobile robot 100, or combinations of internal sounds and external sounds of the mobile robot 100. With respect to internal sounds coming from the mobile robot 100 itself, the ML system 204 is configured to learn normal operating sounds of the mobile robot 100 and then use these normal operating sounds to detect anomalous sounds and/or anomalies (e.g., component malfunctions, unacceptable behaviors, etc.) of the mobile robot 100. Furthermore, in some implementations and/or embodiments, the distribution of the normal operating sound patterns (e.g., clustering, etc.) of the mobile robot 100 may be used to detect other sound patterns that deviate more than a predefined threshold. The ML system 204 may label and/or generate audio event data indicating that these other sound patterns are anomalies or anomalous sounds.

In some implementations and/or embodiments, the ML system 204 is configured to recognize sounds that may require a user's attention and interaction. For example, in some implementations and/or embodiments, the ML system 204 includes at least one pretrained ML model to detect a knocking sound, a whistling sound, and/or a rattling sound of a window, as these sounds may indicate that (i) a window is open during severe weather, (ii) weather stripping is worn down, (iii) another window issue, or (iv) any number and combination thereof. In some implementations and/or embodiments, the ML system 204 includes at least one pretrained ML model to detect vibrating sounds or electrical noises in residential walls, which is indicative of an overloaded circuit breaker, loose electrical outlet, etc. In some implementations and/or embodiments, ML system 204 includes at least one pretrained ML model to recognize clanking sounds from a plumbing system or water flowing sounds in residential walls as being indicative of issues of water pipes or plumbing. In some implementations and/or embodiments, the ML system 204 includes at least one pretrained ML model to detect unusual or persistent sounds of a furnace. In some implementations and/or embodiments, the ML system 204 includes at least one pretrained ML model to detect acoustic activity (e.g., humming noises, electrical noises, etc.) coming from an electrical appliance (e.g., fridge, dishwasher, dryer, electrical outlet, etc.) or a malfunctioning electrical appliance. In some implementations and/or embodiments, the ML system 204 may include at least one pretrained ML model to detect the skittering and scratching sounds in walls or the attic for unwanted wild animals (e.g., rodents, raccoons, birds, etc.) in the house. In any of these implementations, the audio perception system 200 is configured to transmit an alert to notify the user of the audio event data, which was generated by the ML system 204.

Next, the audio perception system 200 uses the audio event data to query the KG 206. The KG 206 comprises a knowledge base, which includes interlinked descriptions of entities along with an encoding of the semantics or relationships underlying these entities. More specifically, as an example, the KG 206 captures a spatial relationship between (i) object/object, (ii) object/region, and (iii) region/region. In this regard, the audio perception system 200 is configured to use reasoning of the KG 206 to determine regions of detected sound sources so that the mobile robot 100 is enabled to navigate towards or away from the regions with detected object sounds depending upon the situation. As a non-limiting example, in FIG. 4, the audio perception system 200 is configured to use the audio event data of "TV" to query the KG 206. Based on this query, the KG 206 may determine that the "TV" has a relation (e.g., "is located in") with "living room" that exhibits probability data of "0.7", another relation (e.g., "is located in") with "kitchen" that exhibits probability data of "0.2," etc. The audio perception system 200 may then use the probability data itself and/or together with the DOA data to determine that the audio event of the "TV" is most likely occurring in the "living room," and then select "living room" as the entity data for the semantic audio scene data.

The KG 206 includes knowledge of the room prototypes, room configuration, residential structure, and other relevant data, which are prepared in advance based on a geographic region and/or a culture of the geographic region of the mobile robot 100. In this regard, there may be different probabilities associated with particular objects appearing in certain locations of residences. For example, in some regions in Asia, there may be residences having kitchen areas that are separate and located outside the residences. For these users, the KG 206 may include knowledge, prototypes, and/or templates, which are compatible with that geographic region.

Also, when the mobile robot 100 is introduced to a new environment (e.g., a new residence) for the first time, the ML system 204 may include at least one pretrained ML model, which has not been adapted completely to this new environment. With the inclusion of the KG 206, the mobile robot 100 is configured to recognize sounds based on knowledge of (i) room prototypes, (ii) common-sense knowledge of probability of sounds generated by objects and the probabilities of object appearances in particular regions. As non-limiting examples, for instance, the mobile robot 100 is configured to detect and recognize that a chopping sound most likely comes from a kitchen, a rumbling or shaking sound of the washing machine most likely comes from a laundry area, etc.

Referring to FIG. 4, with respect to the KG 206, the audio perception system 200 is configured to generate entity data using the audio event data. More specifically, the audio perception system 200 is configured to query the KG 206 using the audio event data and extract the entity data having a relation to the audio event data with a greatest probability. As a non-limiting example, in FIG. 4, the audio perception system 200 is configured to use "TV" (i.e., the first identified audio event) to query the KG 206. The KG 206 is configured to provide contextual information that augments the understanding of the detected audio event of "TV." Based on this query of the KG 206, the audio perception system 200 determines that "living room" is the entity data (e.g., location data) that has a relation (e.g., "is located in") possessing a greatest probability with the "TV" (i.e., the audio event data). Additionally or alternatively, the audio perception system 200 may be configured to extract other entity data based on other relations that are connected to the audio event data via the KG 206, thereby providing additional contextual information of the audio event (in addition to or instead of location data). This seamless interaction between the ML system 204 and the KG 206 enhances the contextual relevance of the audio event data, thereby contributing to a more robust and informed decision-making process for the mobile robot 100.

The audio perception system 200 generates semantic audio scene data, which includes a number of audio feature data (e.g., DOA data, metadata, etc.), audio event data (e.g., sound source data), and related entity data (e.g., location data of the sound source). As a non-limiting example, in FIG. 4, the audio perception system 200 is configured to generate semantic audio scene data based on the audio signals in which the semantic audio scene data includes (i) first audio scene data indicating a first audio event of TV at a direction of 30 degrees in the living room, (ii) second audio scene data indicating a second audio event of a conversation (e.g., speech activity) between humans at a direction of 45 degrees in the living room, and (iii) so forth (if detected and available). In one example, given a scenario in which a TV is an on-state in the living room, the first audio scene data represents the most probable audio scene data given the multi-channel audio signals and the second audio scene data represents the next most probable audio scene data given the same multi-channel audio signals. In another example, given another scenario in which two people are conversing in the living room while the TV in the living room is in an on-state, the first audio scene data and the second audio scene data represent two audio events with greatest probabilities that are detected from the same multi-channel audio signals that are occurring at the same time.

Referring to FIG. 4, as an example, the mobile robot 100 may perform one or more actions (e.g., perform vacuuming, stop vacuuming, etc.) based on the semantic audio scene data. For instance, in FIG. 4, when the TV transitions from an off-state to an on-state and/or when two people are having conversations in the living room, then the mobile robot 100 is configured to generate semantic audio scene data reflecting the current state of the living room and perform an action of navigating away from the living (or navigate towards other regions of its environment before going to the living room) to avoid disrupting the activity in the living room with its cleaning at the current time. As discussed above, the mobile robot 100 is configured to use the semantic audio scene data in a number of applications and/or downstream tasks. In addition, the mobile robot 100 is configured to advantageously enhance layout data or map data of its environment using the semantic audio scene data.

Figure 5:
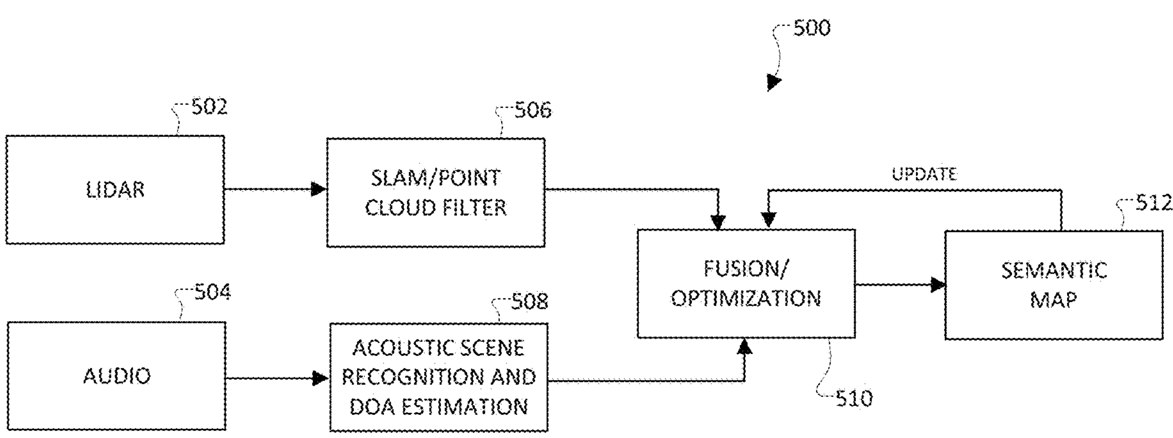
FIG. 5 is a flow diagram of an example of a process involving the audio perception system according to an example embodiment of this disclosure.

FIG. 5 is a flow diagram of an example of a process 500 of the mobile robot 100 involving the audio perception system 200 according to an example embodiment. In this example, the process 500 includes a number of steps that are associated with generating and/or updating a semantic map. The mobile robot 100 may be controlled using the semantic map. For example, the mobile robot 100 may use the semantic map to navigate around its environment, avoid obstacles, and perform one or more actions. Also, the process 500 may include more steps or less steps than those steps discussed with respect to FIG. 5 provided that such modifications provide the same functions and/or objectives as the process 500 of FIG. 5.

At step 502, according to an example, the process 500 includes receiving sensor data from one or more non-audio sensors of the mobile robot 100. For example, the other sensors may include an image sensor (e.g., camera), LIDAR sensor (e.g., 3D LIDAR sensor), any relevant sensor (e.g., infrared, radar, etc.), or any number and combination thereof. As a non-limiting example, for instance, the other sensor data includes at least 3D LIDAR data. Upon receiving the other sensor data from one or more other sensors of the sensor system 608, the process 500 proceeds to step 506.

At step 504, according to an example, the process 500 includes receiving the audio signals from the microphone array 104. The raw audio signals are transmitted from the microphone array 104 to the audio perception system 200. The audio perception system 200 is configured to receive the raw audio signals. As discussed earlier, the audio perception system 200 includes the signal processing system 202, the ML system 204, and the KG 206. Upon receiving the multi-channel audio signals from the microphone array 104, the process 500 proceeds to step 508.

At step 506, according to an example, the process 500 includes generating simultaneous localization and mapping (SLAM) or point cloud data from the other sensor data. In this example, the other sensor data may include LIDAR data from a LIDAR sensor of the sensor system 608. As another example, additionally or alternatively, the other sensor day may include image data from an image sensor. The sensor system 608 and/or the processing system 606 is configured to process the other sensor data and generate processed sensor data (e.g., SLAM data, point cloud data, etc.). Next, after completing step 506, the process 500 proceeds to step 510.

At step 508, according to an example, the process 500 includes performing audio scene recognition and DOA estimation. More specifically, in response to receiving the multi-channel audio signals form the microphone array 104, the audio perception system 200 generates semantic audio scene data. As aforementioned, the audio perception system 200 processes the multi-channel audio signals and generates the semantic audio scene data based on the multi-channel audio signals. The semantic audio scene data includes at least audio event data, DOA data, and location data. The semantic audio scene data advantageous in providing semantic information with respect to the object/landmark detection obtained by the other sensors (e.g., LIDAR). For example, the semantic audio scene data may be used in generating labels that identify detected objects in the point clouds. Upon generating the semantic audio scene data, the process 500 proceeds to step 510.

At step 510, according to an example, the process 500 includes combining the SLAM data and the semantic audio scene data. This combining step may include fusing and optimizing the SLAM data and the semantic audio scene data. In this regard, for example, the audio perception system 200 may provide semantic audio scene data for map construction to support SLAM (simultaneous localization and mapping). The audio perception system 200 is configured to reduce any ambiguity of detected objects, which will require less real-time computational memory/resources than both LIDAR-based or visual-based SLAM, particularly on an embedded platform. After fusing and/or optimizing the SLAM data and the semantic audio scene data, the process 500 proceeds to step 512.

At step 512, according to an example, the process 500 includes generating a semantic map or updating the semantic map based on the optimization of the sensor-fusion data (e.g., the semantic audio scene data and the SLAM data). In general, the semantic map includes at least semantic labels for detected objects and identified regions in association with particular positions and locations in an environment. For instance, the semantic map may include semantic labels for detected objects or detected sound sources (e.g., microwave, TV, washing machine, dryer, dog, toilet, etc.) and semantic labels for identified regions (e.g., kitchen, laundry room, living room, bathroom, bedroom, hallway, etc.) in association with location data of the environment. The semantic map provides the mobile robot 100 with greater accuracy and information by using hybrid data (e.g., at least LIDAR data and audio scene data) in relation to location data. The semantic map may include layout data of the environment. Upon generating or updating the semantic map, the process 500 is configured to proceed to step 510 upon receiving new SLAM/point cloud data and acoustic scene data when the mobile robot 100 receives new sensor data of the environment.

Figure 6:
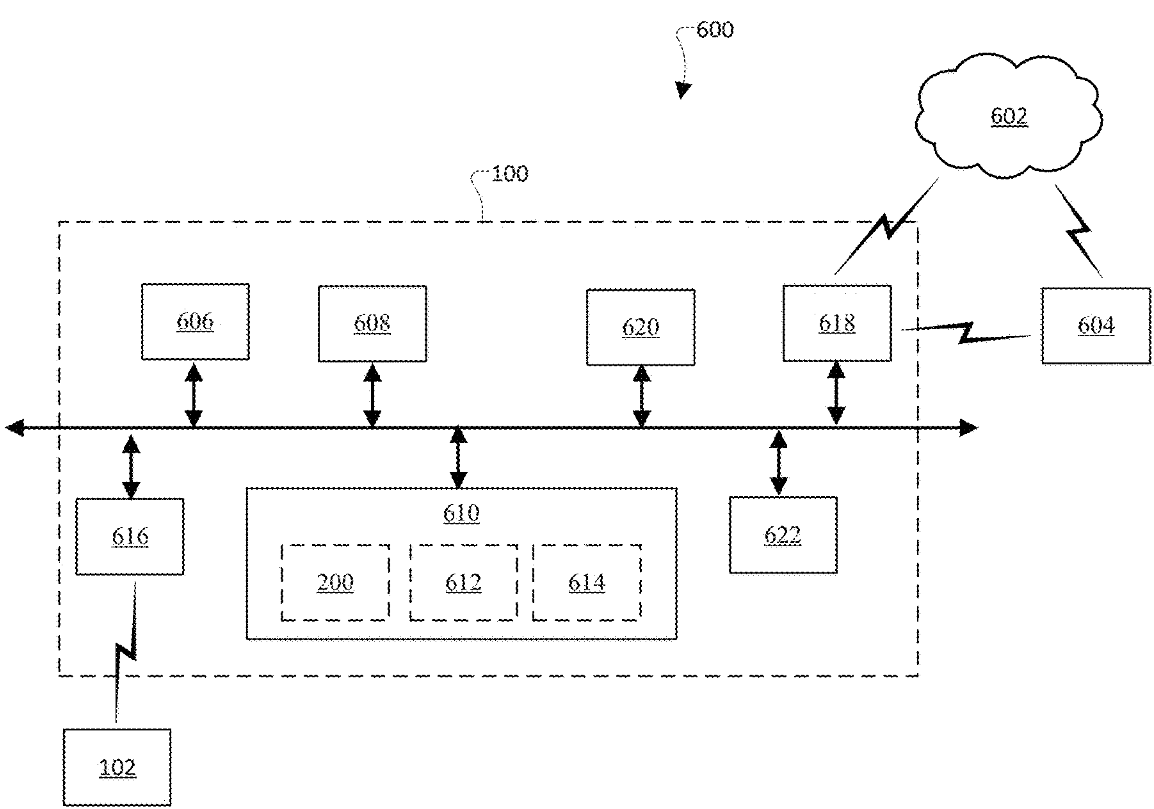
FIG. 6 is a block diagram of an example of system that includes the mobile robot according to an example embodiment of this disclosure.

FIG. 6 is a block diagram of an example of a system 600, which includes the mobile robot 100, according to an example embodiment. More specifically, in this example, the system 600 includes at least the mobile robot 100 along with the docking station 102. In addition, the system 600 is configured to include a remote computing system 602 and one or more mobile communication devices 604, which communicate with the mobile robot 100 and/or the remote computing system 602. For example, the mobile communication device 604 may include a mobile phone (e.g., smart phone, etc.), a tablet computer, a laptop computer, etc. The mobile communication device 604 may provide alerts, notifications, sensor data (e.g., digital images, audio data, etc.), or any number and combination thereof regarding the audio event data and/or the audio scene data.

As shown in FIG. 6, the mobile robot 100 includes at least a processing system 606 with at least one processing device. For example, the processing system 606 includes at least an electronic processor, a central processing unit (CPU), a graphics processing unit (GPU), a Tensor Processing Unit (TPU), a microprocessor, a field-programmable gate array (FPGA), an application-specific integrated circuit (ASIC), any suitable processing technology, or any number and combination thereof. The processing system 606 is operable to provide the functionality as described herein.

The mobile robot 100 is configured to include at least one sensor system 608. The sensor system 608 senses the environment and generates sensor data based thereupon. The sensor system 608 is in data communication with the processing system 606. The sensor system 608 is also directly or indirectly in data communication with the memory system 610. The sensor system 608 includes a number of sensors. As aforementioned, the sensor system 608 includes a microphone array or a set of microphones. In addition, the sensor system 608 includes a motion sensor. The sensor system 608 includes an image sensor, a light detection and ranging (LIDAR) sensor, or any number and combination thereof. Also, the sensor system 608 may include a thermal sensor, an ultrasonic sensor, an infrared sensor, a radar sensor, a bump sensor, a satellite-based radio navigation sensor (e.g., GPS sensor), any applicable sensor, or any number and combination thereof. In this regard, the sensor system 608 includes a set of sensors that enable the mobile robot 100 to sense its environment and use that sensing information to operate effectively in its environment.

The mobile robot 100 includes a memory system 610, which is operatively connected to the processing system 606. In an example embodiment, the memory system 610 includes at least one non-transitory computer readable storage medium, which is configured to store and provide access to various data to enable at least the processing system 606 to perform the operations and functionality, as disclosed herein. The memory system 610 comprises a single memory device or a plurality of memory devices. The memory system 610 may include electrical, electronic, magnetic, optical, semiconductor, electromagnetic, or any suitable storage technology that is operable with the mobile robot 100. For instance, the memory system 610 includes random access memory (RAM), read only memory (ROM), flash memory, a disk drive, a memory card, an optical storage device, a magnetic storage device, a memory module, any suitable type of memory device, or any number and combination thereof.

The memory system 610 includes at least a control program 612, the audio perception system 200, and other relevant data 614, which are stored thereon and which each include computer readable data. The computer readable data may include instructions, code, routines, various related data, any software technology, or any number and combination thereof. The instructions, which, when executed by the processing system 606, is configured to perform at least the functions described in this disclosure.

The control program 612 is configured to control the mobile robot 100 directly or indirectly based on various data (e.g., user commands, sensor data, semantic audio scene data, semantic map, etc.). The audio perception system 200 is configured to generate semantic audio scene data based on the audio signals. Meanwhile, the other relevant data 614 provides various data (e.g., operating system, etc.), which relate to one or more components of the mobile robot 100 and enables the mobile robot 100 to perform the functions as discussed herein.

In addition, the mobile robot 100 includes other functional modules 616. The other functional modules 616 may include a power source (e.g., one or more batteries, etc.), which is chargeable by a power supply of the docking station 102. The other functional modules 616 may include one or more I/O devices (e.g., display device, speaker device, etc.). The one or more I/O devices may provide alerts, notifications, sensor data (e.g., digital images, audio data, etc.), or any number and combination thereof regarding the audio event data and/or the audio scene data. Also, the other functional modules 616 may include any relevant hardware, software, or combination thereof that assist with or contribute to the functioning of the mobile robot 100.

The mobile robot 100 also includes communication technology 618 (e.g., wired communication technology, wireless communication technology, or a combination thereof) that enables components of the mobile robot 100 to communicate with (i) each other, (ii) the remote computing system 602 (e.g., cloud computing system, server, etc.), (iii) one or more mobile communication devices 604, (iv) or any number and combination thereof. The communication technology 618 may communicate with one or more communication/computer networks.

Furthermore, the mobile robot 100 includes an accessory assembly 620. The accessory assembly 620 is configured to perform a task. For example, in FIG. 1, the mobile robot 100 is a cleaning robot and the accessory assembly 620 comprises a cleaning apparatus. In this example the accessory assembly 620 includes a number of vacuuming components (e.g., vacuum suction system), which enable the mobile robot 100 to perform one or more actions relating to vacuuming various surfaces (e.g., carpet, etc.). The accessory assembly 620 may include a number of cleaning components (e.g., brush, dust cloth, etc.)

Also, the mobile robot 100 includes a set of actuators 622. The set of actuators 622 include one or more actuators, which relate to enabling the mobile robot 100 to perform one or more of the actions and functions of the mobile robot 100 as described herein. For example, the set of actuators may include one or more actuators, which relate to driving wheels of the mobile robot 100 so that the mobile robot 100 is configured to move around its environment. The set of actuators may include one or more actuators, which relate steering the mobile robot 100. The set of actuators may include one or more actuators, which relate to a braking system that stops a movement of the wheels of the mobile robot 100. The set of actuators may include one or more actuators, which relate to controlling or driving the accessory assembly 620. In this regard, the set of actuators may include one or more actuators, which relate to other actions and/or functions of the mobile robot 100.

As described in this disclosure, the mobile robot 100 provides several advantages and benefits. For example, the mobile robot 100 includes an audio perception system 200, which advantageously provides the mobile robot 100 with semantic perception of audio scenes in its environment. With the audio perception system 200, the mobile robot 100 is configured to perform one or more actions using semantic audio scene data of its environment. The semantic audio scene data provides the mobile robot 100 with contextual and semantic information of its environment, as well as one or more acoustic activities occurring in its environment. With the semantic audio scene data, the mobile robot 100 is configured to identify sound sources and their corresponding locations so that the mobile robot 100 may identify and navigate towards or away from certain objects, certain events, certain regions, or any combination thereof. In this regard, the mobile robot 100 may be controlled to maintain a predetermined distance between the mobile robot 100 and a particular object and/or a particular region in its environment. The mobile robot 100 is also configured to advantageously provide audio monitoring of itself and its environment. The mobile robot 100 is also configured to perform at least one action (e.g., vacuuming carpet, sending an alert to a mobile communication device 604, etc.) selectively and effectively based on the semantic audio scene data.

In addition, the mobile robot 100 is configured to detect and recognize static objects (e.g., refrigerator, washing machine, etc.) and dynamic objects (e.g., a barking dog, a crying child, etc.) in its environment, as well as their direction (e.g., DOA) and location (e.g., kitchen, laundry room, etc.) relative to the mobile robot 100 and/or its environment. Also, with the audio perception system 200, the mobile robot 100 is configured to detect and recognize objects, which may not be detectable by other sensors (e.g., camera, LIDAR, etc.) due to malfunction, object occlusion, etc. In this regard, for example, the mobile robot 100 is advantageous in being configured to effectively operate in a number of scenarios, such as when there is insufficient lighting, camera malfunction, object occlusion, etc.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method for controlling a mobile robot in an environment, the computer-implemented method comprising:

receiving audio signals via a microphone array, the microphone array including a set of microphones at least partially disposed on the mobile robot;

extracting audio feature data of acoustic activity from the audio signals;

generating Direction-of-Arrival (DOA) data of the acoustic activity based on the audio signals;

generating, via at least one pretrained machine learning model, audio event data using the audio feature data, the audio event data identifying at least one sound source of the audio feature data;

extracting entity data by using the audio event data to query a knowledge graph, the entity data having a relation with the audio event data, the entity data including location data that identifies a location of the at least one sound source within the environment;

generating semantic audio scene data using the audio event data, the DOA data, and the entity data, the semantic audio scene data including an association between the at least one sound source, a direction of the at least one sound source relative to the mobile robot, and the location data that identifies the location of the at least one sound source; and performing an action of the mobile robot based on the semantic audio scene data.

2. The computer-implemented method of claim 1, further comprising:

generating layout data of the environment using one or more sensors of the mobile robot, the one or more sensors including an image sensor; and generating a semantic map by combining the layout data with the semantic audio scene data, wherein the action includes actuating an actuator of the mobile robot based on the semantic map.

3. The computer-implemented method of claim 1, wherein:

the location data and the audio event data are connected by a relation of the knowledge graph, the relation having a greatest probability from among other relations of the knowledge graph.

4. The computer-implemented method of claim 1, further comprising:

generating filtered data of the acoustic activity by performing noise cancellation on the audio signals to remove self-noise of the mobile robot;

extracting speech data from the filtered data; and extracting non-speech data from the filtered data, wherein the audio feature data includes the speech data and the non-speech data.

5. The computer-implemented method of claim 1, further comprising:

generating room impulse response data using the audio signals, wherein the audio feature data includes the room impulse response data.

6. The computer-implemented method of claim 1, wherein the action includes sending a message to a mobile communication device to provide notification of the semantic audio scene data.

7. The computer-implemented method of claim 1, wherein:

the mobile robot is configured to couple to a docking station;

the docking station includes a power supply for the mobile robot;

the mobile robot includes a cleaning apparatus; and the set of microphones include a first subset of microphones disposed on the mobile robot and a second subset of microphones disposed on the docking station.

8. A mobile robot comprising:

a microphone array;

one or more processors in data communication with the microphone array; and one or more memory in data communication with the one or more processors, the one or more memory including computer readable data stored thereon that, when executed by the one or more processors, causes the processor to perform a method that includes receiving audio signals via the microphone array, the microphone array including a set of microphones at least partially disposed on the mobile robot;

extracting audio feature data of acoustic activity from the audio signals;

generating Direction-of-Arrival (DOA) data of the acoustic activity based on the audio signals;

generating, via at least one pretrained machine learning model, audio event data using the audio feature data, the audio event data identifying at least one sound source of the audio feature data;

extracting entity data by using the audio event data to query a knowledge graph, the entity data having a relation with the audio event data, the entity data including location data that identifies a location of the at least one sound source within the environment;

generating semantic audio scene data using the audio event data, the DOA data, and the entity data, the semantic audio scene data including an association between the at least one sound source, a direction of the at least one sound source relative to the mobile robot, and the location data that identifies the location of the at least one sound source; and performing an action of the mobile robot based on the semantic audio scene data.

9. The mobile robot of claim 8, wherein the method further comprises:

generating layout data of an environment using one or more sensors of the mobile robot, the one or more sensors including a light detection and ranging (LIDAR) sensor; and generating a semantic map by combining the layout data with the semantic audio scene data, wherein the action includes actuating an actuator of the mobile robot based on the semantic map.

10. The mobile robot of claim 8, wherein:

the location data and the audio event data are connected by a relation of the knowledge graph, the relation having a greatest probability from among other relations of the knowledge graph.

11. The mobile robot of claim 8, wherein the method further comprises:

generating filtered data of the acoustic activity by performing noise cancellation on the audio signals to remove self-noise of the mobile robot;

extracting speech data from the filtered data; and extracting non-speech data from the filtered data, wherein the audio feature data includes the speech data and the non-speech data.

12. The mobile robot of claim 8, wherein the method further comprises:

generating room impulse response data using the audio signals, wherein the audio feature data includes the room impulse response data.

13. The mobile robot of claim 8, wherein the action includes sending a message to a mobile communication device to provide notification of the semantic audio scene data.

14. The mobile robot of claim 8, wherein:

the mobile robot is configured to couple to a docking station;

the docking station includes a power supply for the mobile robot;

the mobile robot includes a cleaning apparatus; and the set of microphones include a first subset of microphones disposed on the mobile robot and a second subset of microphones disposed on the docking station.

15. One or more non-transitory computer-readable media that store instructions that, when executed by one or more processors, cause the one or more processors to perform a method for controlling a mobile robot in an environment, the method comprising:

receiving audio signals via a microphone array, the microphone array including a set of microphones at least partially disposed on the mobile robot;

extracting audio feature data of acoustic activity from the audio signals;

generating Direction-of-Arrival (DOA) data of the acoustic activity based on the audio signals;

generating, via at least one pretrained machine learning model, audio event data using the audio feature data, the audio event data identifying at least one sound source of the audio feature data;

extracting entity data by using the audio event data to query a knowledge graph, the entity data having a relation with the audio event data, the entity data including location data that identifies a location of the at least one sound source within the environment;

generating semantic audio scene data using the audio event data, the DOA data, and the entity data, the semantic audio scene data including an association between the at least one sound source, a direction of the at least one sound source relative to the mobile robot, and the location data that identifies the location of the at least one sound source; and performing an action of the mobile robot based on the semantic audio scene data.

16. The one or more non-transitory computer-readable media of claim 15, wherein the method further comprises:

generating layout data of the environment using one or more sensors of the mobile robot, the one or more sensors including a light detection and ranging (LIDAR) sensor; and generating a semantic map by combining the layout data with the semantic audio scene data, wherein the action includes actuating an actuator of the mobile robot based on the semantic map.

17. The one or more non-transitory computer-readable media of claim 15, wherein the location data and the audio event data are connected by a relation of the knowledge graph, the relation having a greatest probability from among other relations of the knowledge graph.

18. The one or more non-transitory computer-readable media of claim 15, further comprising:

generating filtered data of the acoustic activity by performing noise cancellation on the audio signals to remove self-noise of the mobile robot;

extracting speech data from the filtered data; and extracting non-speech data from the filtered data, wherein the audio feature data includes the speech data and the non-speech data.

19. The one or more non-transitory computer-readable media of claim 15, further comprising:

generating room impulse response data using the audio signals, wherein the audio feature data includes the room impulse response data.

20. The one or more non-transitory computer-readable media of claim 15, wherein:

the mobile robot is configured to couple to a docking station;

the docking station includes a power supply for the mobile robot;

the mobile robot includes a cleaning apparatus; and the set of microphones include a first subset of microphones disposed on the mobile robot and a second subset of microphones disposed on the docking station.

* * * * *